United States Patent
Hoyt et al.

(10) Patent No.: US 7,153,341 B2
(45) Date of Patent: Dec. 26, 2006

(54) PROCESSES FOR CONTROLLING REGENERATIVE SWEEP AIR FOR MEMBRANE SYSTEMS

(75) Inventors: Dean Hoyt, Burlington, MA (US); Douglas Moore, Epping, NH (US)

(73) Assignee: Parker-Hannifin Corporation, Cleveland, OH (US)

( * ) Notice: Subject to any disclaimer, the term of this patent is extended or adjusted under 35 U.S.C. 154(b) by 293 days.

(21) Appl. No.: 10/783,918

(22) Filed: Feb. 20, 2004

(65) Prior Publication Data
US 2004/0194483 A1 Oct. 7, 2004

Related U.S. Application Data

(60) Provisional application No. 60/460,850, filed on Apr. 4, 2003.

(51) Int. Cl.
*B01D 53/22* (2006.01)
*B01D 53/26* (2006.01)

(52) U.S. Cl. .................. 95/1; 95/10; 95/19; 95/22; 95/23; 95/45; 95/52; 96/4; 96/8; 96/9; 96/10; 96/421; 96/422

(58) Field of Classification Search .............. 95/1, 95/10, 19, 22, 23, 45, 52; 96/4, 8, 9, 10, 96/421, 422
See application file for complete search history.

(56) References Cited

U.S. PATENT DOCUMENTS

| | | | |
|---|---|---|---|
| 3,735,558 A | 5/1973 | Skarstrom et al. | |
| 4,944,776 A | 7/1990 | Keyser et al. | |
| 5,129,920 A | 7/1992 | Albers et al. | |
| 5,152,966 A | 10/1992 | Roe et al. | |
| 5,160,514 A | 11/1992 | Newbold et al. | |
| 5,375,620 A * | 12/1994 | Ginder, Jr. | 137/115.09 |
| 5,525,143 A * | 6/1996 | Morgan et al. | 95/52 |
| 5,605,564 A | 2/1997 | Collins | |
| 5,800,597 A | 9/1998 | Perrotta et al. | |
| 6,004,383 A * | 12/1999 | Kuhnelt | 95/52 |
| 6,007,603 A | 12/1999 | Garrett | |
| 6,027,546 A | 2/2000 | Kusters et al. | |
| 6,070,339 A | 6/2000 | Cunkelman | |
| 6,083,297 A | 7/2000 | Valus et al. | |
| 6,128,825 A * | 10/2000 | Cunkelman | 95/52 |

(Continued)

FOREIGN PATENT DOCUMENTS

JP    2001-219206    * 8/2001

(Continued)

OTHER PUBLICATIONS

Bulletin FNS-3000/02-A, Balston© SMART Dryer™ 3000 Series Membrane Air Dryers, Aug. 2002.

(Continued)

*Primary Examiner*—Jason M. Greene
(74) *Attorney, Agent, or Firm*—Christopher H. Hunter

(57) ABSTRACT

A process for controlling the volume of dry air, dried to a predetermined degree of dryness, from a sweep manifold of an air dryer system, flowing over a plurality of gas/liquid fluid separating membranes, comprising: diverting a predetermined volume of dried air to the manifold; sensing one of the flow volume and humidity values of the remainder of the dried air or the pressure differential within the system; and utilizing one of the differential pressure to control the predetermined volume of dried air and utilizing a controller for achieving the predetermined degree of dryness by controlling at least one solenoid valve which, in turn, controls the flow volume of the predetermined volume of dried air diverted to the manifold.

10 Claims, 5 Drawing Sheets

U.S. PATENT DOCUMENTS

| | | |
|---|---|---|
| 6,156,096 A | 12/2000 | Sirkar |
| 6,241,423 B1 | 6/2001 | Thomas |
| 6,296,683 B1 | 10/2001 | Koch |
| 6,616,735 B1 * | 9/2003 | Burban et al. ............... 95/52 |
| 6,719,825 B1 * | 4/2004 | Wedge et al. ............... 95/52 |
| 6,740,140 B1 * | 5/2004 | Giglia et al. ............... 95/52 |

FOREIGN PATENT DOCUMENTS

| | | | |
|---|---|---|---|
| JP | 2001-232137 | * | 8/2001 |
| JP | 2002-45638 | * | 2/2002 |
| JP | 2004-57986 | * | 2/2004 |

OTHER PUBLICATIONS

Bulletin TI-3100B, Technical Information, Installation, Operation and Maintenance Manual, Balston® SMART Dryer™ Models SMRT3100NA, SMRT3200NA, SMRT3300NA, SMRT3400NA, SMRT3500NA, and SMRT3600NA, 2002, 2003.

* cited by examiner

PROCESSES FOR CONTROLLING REGENERATIVE SWEEP AIR FOR MEMBRANE SYSTEMS

CROSS-REFERENCE TO RELATED CASES

The present application claims the benefit of the filing date of U.S. Provisional Application Ser. No. 60/460,850 filed Apr. 4, 2003, the disclosure of which is incorporated herein by reference.

FIELD OF THE INVENTION

The present invention pertains to the drying of air, e.g., compressed air, specifically to processes for controlling the volume of dry air emanating from the regenerative sweep manifold of an air dryer system and flowing over a plurality of gaseous/liquid fluid separating membranes of the dryer system.

BACKGROUND OF THE INVENTION

In many process applications the dew point of air in a particular environment must be controlled below a predetermined level. For example, in pneumatically operated fluidic systems, if the dew point of the pneumatic air is reached or exceeded, the condensed water can adversely affect associated elements. The same is true in applications utilizing compressed air.

In state-of-the-art dehydration membrane technology, such as that set forth in U.S. Pat. No. 6,083,297, to Valus et al., also assigned to the assignee of the present invention, water vapor from e.g., a compressed air supply passes through the hollow fibers of the membrane. At the same time, a small portion of the dry air product is redirected along the length of the fibers to sweep out the water vapor which has permeated the membrane. The moisture-laden sweep gas is then vented to atmosphere, and clean, dry air is supplied to the compressed air distribution system. The structure in which the present invention finds utility is set forth in Parker-Hannifin Corporation Bulletin FNS-3000/02-A, and in Parker-Hannifin Corporation Bulletin TI-3100A, both of which pertain to the Balston® SMART Dryer™ 3000 Series Membrane Air Dryers.

Since the pressure of the water vapor-containing gas is variable, and because there is always some pressure drop through the lumens of the membrane fibers, it has been difficult to design a module that permits a predetermined portion of the product gas to be returned as the sweep gas at a relatively constant rate. Prior art systems that have attempted to regulate sweep air flow include, among others, U.S. Pat. No. 5,605,564 to Collins, which conserves sweep air by controlling the upstream pressure on the sweep orifice through the use of a pressure regulator. With this process, the sweep is constant irrespective of the actual product flow. The system of the present invention takes into account the actual process flow and sweep flows accordingly.

In U.S. Pat. No. 5,160,514 to Newbold et al., sweep air is conserved by modulating an integral sweep valve within a membrane module based upon the pressure differential that exists between inlet and outlet gas caused by fluid dynamic forces, i.e. friction and turbulence etc., as the gas to be dried flows down the bore of the fiber. Although this pressure drop is related to the gas flow rate, it is also related to the bore diameter of the fibers. Considering that variation in fiber diameter and process tolerances exist for fiber ID, it would appear to produce more variability in sweep flow adjustment as opposed to systems which, as in the present invention, directly measure product flow.

In U.S. Pat. No. 6,070,339 to Cunkelman, the sweep air flow through a pneumatic controlled purge valve is reduced, however the sweep control is limited to a full 100% sweep under a fully loaded compressor and to zero sweep under a fully unloaded compressor condition. Therefore, it does not adjust sweep according to flow rate, as is the case in the present invention.

U.S. Pat. No. 3,735,558 to Skarstrom et al. pertains to a fixed sweep dryer wherein the sweep flow is controlled by a fixed orifice or valve which is adjusted by the manufacturer for a predetermined level of dryness. In contrast thereto, the present invention pertains to a variable sweep dryer.

Similarly, U.S. Pat. No. 6,296,683 B1 to Koch, pertaining to a dryer for compressed air, utilizes a membrane dryer with a manual valve, such as a needle valve, to set the sweep flow. The manufacturer of this device, or the user thereof, can adjust the amount of sweep gas "manually" to obtain differing levels of drying performance. Once the valve is set, it acts like a fixed orifice and the volume of sweep gas is not changed unless the valve is readjusted and is thus, in effect and contrast to the present invention, a fixed sweep system.

SUMMARY OF THE INVENTION

One of the processes of this invention pertains to a process for controlling the volume of the flow of dry air, dried to a predetermined degree of dryness, emanating from a sweep manifold of an air dryer system, flowing over a plurality of gaseous/liquid fluid separating membranes of the air dryer system, the process comprising the steps of: diverting a predetermined volume of dried air, at a predetermined pressure, to a sweep manifold; sensing one of the flow volume and the humidity values of the remainder of the dried air and converting one of the flow volume and humidity values to electrical signals; and having a controller, for achieving the predetermined degree of dryness of the air, and utilizing the electrical signals for controlling at least one solenoid valve which in turn controls the flow volume of the predetermined volume of dried air diverted to the sweep manifold.

Preferably the sensing is the sensing of the flow volume and the controller controls the duty cycle of the at least one solenoid valve, thereby controlling the flow volume values over the membranes and the duty cycle comprises repeating cycles of on/off operation thereof.

In a further process of this invention, the sensing is the sensing of the flow volume and the controller controls at least two solenoid valves associated with different sized orifices, respectively, and the controller, by sequencing the at least two solenoid valves, controls the flow volume values over the membranes.

Preferably, the sequencing includes pluralities of operational and non-operational combinations of the solenoid valves.

In another process of this invention, the sensing is the sensing of the humidity values and the controller controls the duty cycle of the at least one solenoid valve, thereby controlling the flow volume values over the membranes. Preferably, the duty cycle comprises repeating cycles of on/off operation. Furthermore, the predetermined degree of dryness is preferably measured in terms of one of humidity and dew point at a specified temperature and pressure.

A different process of this invention pertains to a process for controlling the volume of the flow of dry air, dried to a predetermined degree of dryness, emanating from a sweep manifold of an air dryer system, flowing over a plurality of gas/liquid fluid separating membranes of said air dryer system, the process comprising: diverting a predetermined volume of dried air, at a predetermined pressure, to a sweep manifold; sensing the differential pressure within the air dryer system; and utilizing the differential pressure to control the flow volume of the predetermined volume of dried air diverted to the sweep manifold.

Preferably, the flow volume control is performed via a proportional flow control valve and the differential pressure sensing includes passing air through a restriction.

Furthermore, the restriction, which may be fixed restriction, can be located within the proportional flow control valve or in a location other than the proportional flow control valve. The sensing of the differential pressure may be accomplished between two points within the air dryer system.

Yet a further process of this invention pertains to a process for controlling the volume of the flow of dry air, dried to a predetermined degree of dryness, emanating from a sweep manifold of an air dryer system, flowing over a plurality of gas/liquid fluid separating membranes of the air dryer, the process comprising: diverting a predetermined volume of dried air to a sweep manifold; sensing one of the flow volume and humidity values of the remainder of the dried air or the pressure differential within the air dryer system; and utilizing one of the differential pressure to control the flow volume of the predetermined volume of dried air and utilizing a controller for achieving the predetermined degree of dryness of the air by controlling at least one solenoid valve which, in turn, controls the flow volume of the predetermined volume of dried air diverted to the sweep manifold.

Preferably, the diverting, of a predetermined volume of dried air to a sweep manifold, is accomplished at a predetermined pressure.

In one variation thereof, the sensing is the sensing of the flow volume, and the controller controls at least two solenoid valves, associated with differing size orifices, respectively, wherein the controller, by predetermined sequencing the at least two solenoid valves, controls the flow volume. The predetermined sequencing includes pluralities of operational and non-operational combinations of the solenoid valves.

In another variation thereof, the sensing is the sensing of the flow volume and the controller controls the duty cycle of the at least one solenoid valve, thereby controlling the flow volume of the dry air over the membrane. The duty cycle includes repeating cycles of on/off operation.

In a further variation thereof, the sensing is the sensing of the humidity values and the controller controls the duty cycle of the at least one solenoid valve, thereby controlling the flow volume of the dry air over the membrane. The duty cycle includes pluralities of repeating cycles of on/off operation.

In still another variation thereof, the sensing is the sensing of the differential pressure within the air dryer system.

In yet a further variation thereof, the utilizing is the utilizing of the differential pressure to control the flow volume.

In an additional variation thereof, the flow volume control is accomplished via a proportional flow control valve. Preferably, the differential pressure sensing includes passing air through a restriction, with the restriction being a fixed restriction. The restriction can be located within the proportional flow control valve or is located in a location other than the proportional flow control valve.

Preferably, the sensing of the differential pressure is accomplished between two points within the air dryer system and the predetermined degree of dryness is measured in terms one of humidity and dew point, at a specified temperature and pressure.

The foregoing advantages, constructions and methods or processes of operation of the present invention will become more readily apparent from the following description in conjunction with the accompanying drawings. Further features and advantages of the present invention will become apparent to those skilled in the art upon review of the following specification in conjunction with the accompanying drawings.

BRIEF DESCRIPTION OF THE DRAWINGS

Similar numerals refer to similar parts throughout the several drawings.

DETAILED DESCRIPTION OF THE PREFERRED EMBODIMENTS

In the following description, certain terms will be used for brevity, clearness and understanding. No unnecessary limitations are to be implied therefrom beyond the requirement of the prior art because such terms will be used for descriptive purposes and are intended to be broadly construed. Moreover, the description and the accompanying illustrations are not limited to the exact details and apparatuses shown and about to be described.

Figure 1:
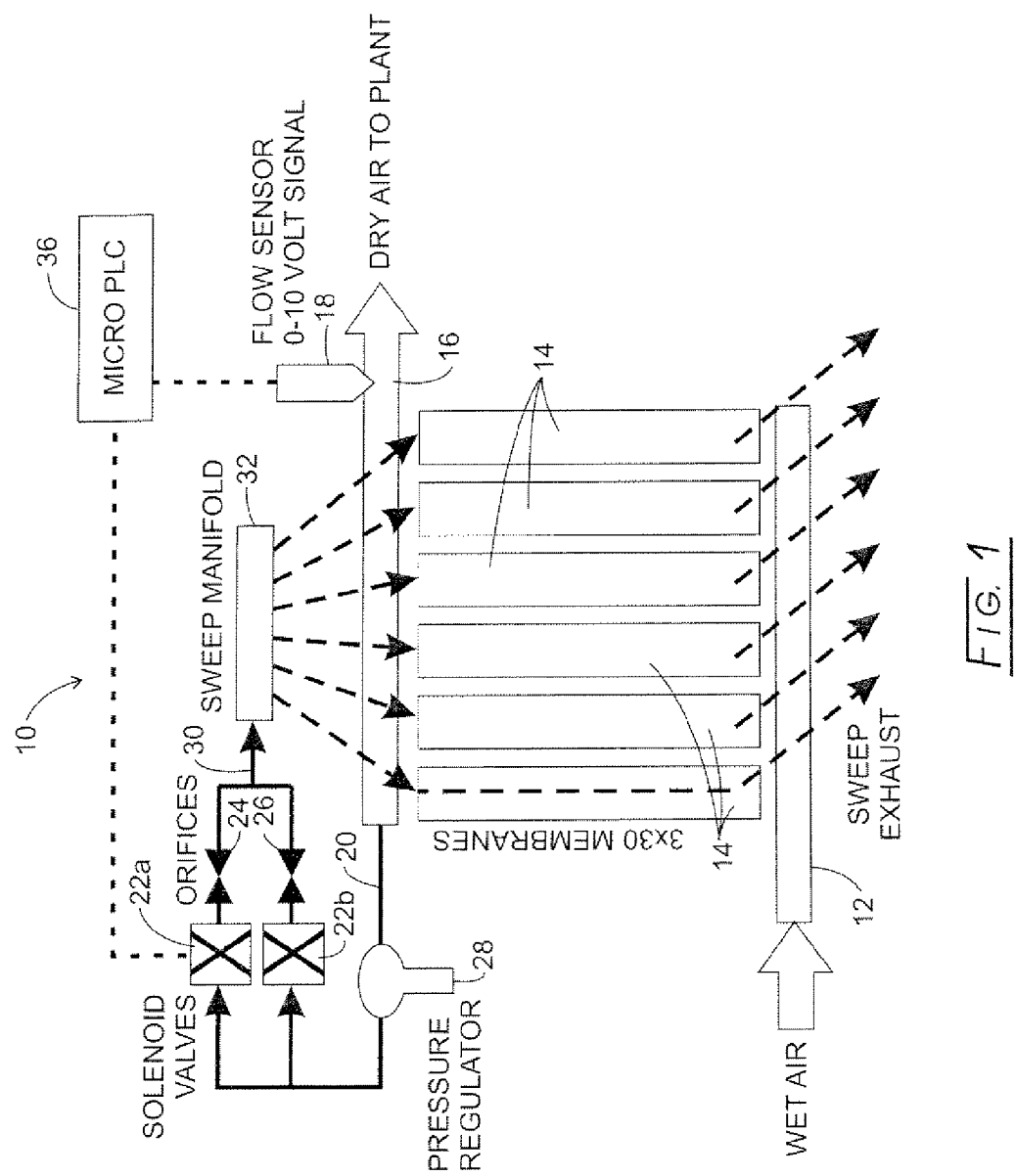
FIG. 1 is a schematic showing of a first embodiment of the present invention.

Turning now to the drawings, and particularly to FIG. 1, there is shown a schematic diagram of a first embodiment of the present invention. Specifically, there is shown a schematic of a commercial air dryer system 10 (such as the Balston® SMART Dryer™ 3000 Series Membrane Air Dryer, available from the Parker-Hannifin Corporation), comprised basically of a wet compressed air input conduit 12; a plurality of commercial gaseous/liquid fluid separating membranes 14 (e.g., such as Membrane Modules D01-0031 et al., available from Parker-Hannifin Corp. and the subject of U.S. Pat. No. 6,083,297 to Valus et al., also assigned to the assignee of this invention); a compressed dry air main output conduit 16; a commercial air flow sensor 18 (e.g., such as Air Flow Sensor FCS-M18-LIX, available from Turck, Inc., of Plymouth Minn.); a dry air diverter line 20 extending from main dry air conduit 16 into at least two commercial parallel electric solenoid valves 22a and 22b (e.g., available from Parker-Hannifin Corporation) for respectively controlling at least two commercial, parallel, differing size orifices 24, 26 (e.g., such as V-[Size]-BR NPT Orifices, available from O'Keefe Controls of Trumbull, Conn.).

Interposed between solenoid valves 22a, 22b, and membranes 14 is a commercial pressure regulator 28 (e.g., such as Pressure Regulator R119-06C, available e.g., from Parker-Hannifin Corporation). The parallel dry air outlet lines from orifices 24 and 26 are combined into a dry air inlet line 30 that terminates into a sweep manifold 32 which forms a part of air dryer system 10. The operation of solenoid valves 22a, 22b are controlled via a commercial Micro PLC and Power Supply 36 (e.g., such as available from Siemens Industrial Automation Systems).

Figure 2:
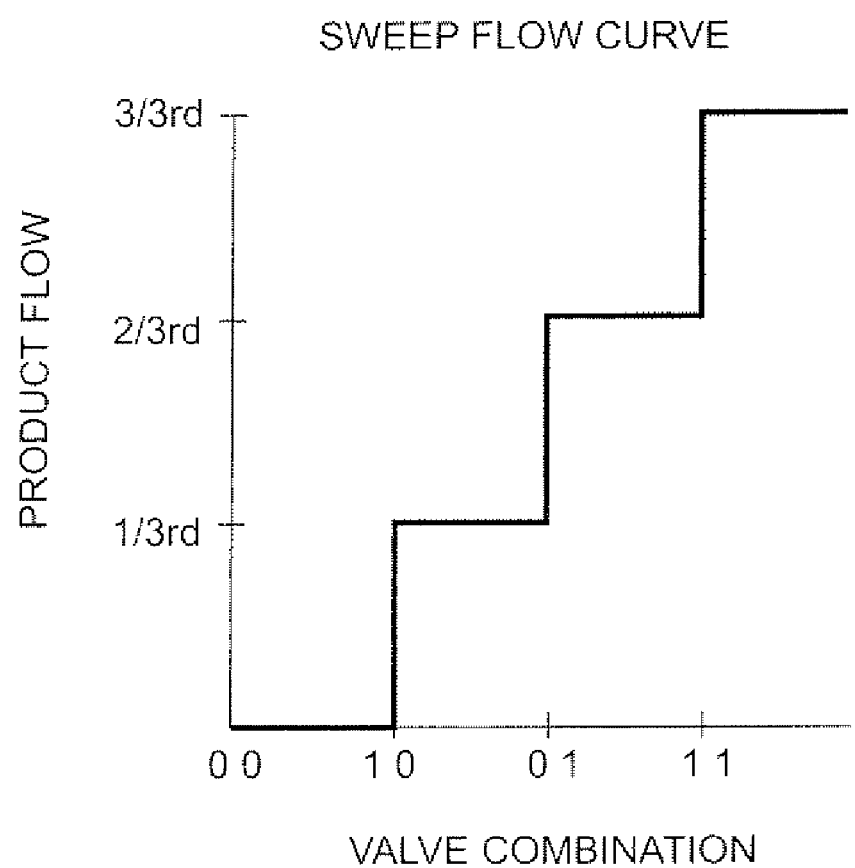
FIG. 2 sets forth a diagrammatic sweep flow curve that is part of the control logic utilized by the FIG. 1 embodiment.

Turning now to the operation of the at least two solenoid valves 22a, 22b, for controlling the sweep gas flow, for example, using the two solenoid valves 22a, 22b, for respectively controlling the differing size orifices 24 and 26, one will obtain four discrete flow levels. Letting '1' represent when the solenoid valve is 'open' and '0' represent the solenoid valve that is 'off', the four discrete sweep flows are '00', '10', '01' and '11'. The '00' combination corresponds to zero sweep flow and the '11' combination corresponds to full sweep flow. The '10' and '01' combinations, of course, fall somewhere between the noted levels and (depending on orifice sizing) can, if so desired, e.g., fall at ⅓ an ⅔ of the total sweep flow. This is graphically illustrated in FIG. 2.

If deemed desirable, three or more solenoid valves and differing size orifices can be used for even more graduated sweep flow combinations. Micro PLC 36 or a PCB can be used with an analog or differential pressure sensor 18 to control the noted solenoid valve switching combinations. For example, an analog signal (e.g. 0–10 volts) from the sensor will be separated into the four noted increments and assigned to the above-noted switch combinations, using micro PLC 36. Therefore, as the dry airflow increases, indicating an increase in the dry air consumption or usage, the sweep flow increases, in discrete amounts, accordingly. Advantages of the structure and function of this first embodiment of this invention include a very simple, reliable and cost effective control system, together with low wear and tear on the at least two solenoid valves.

Figure 3:
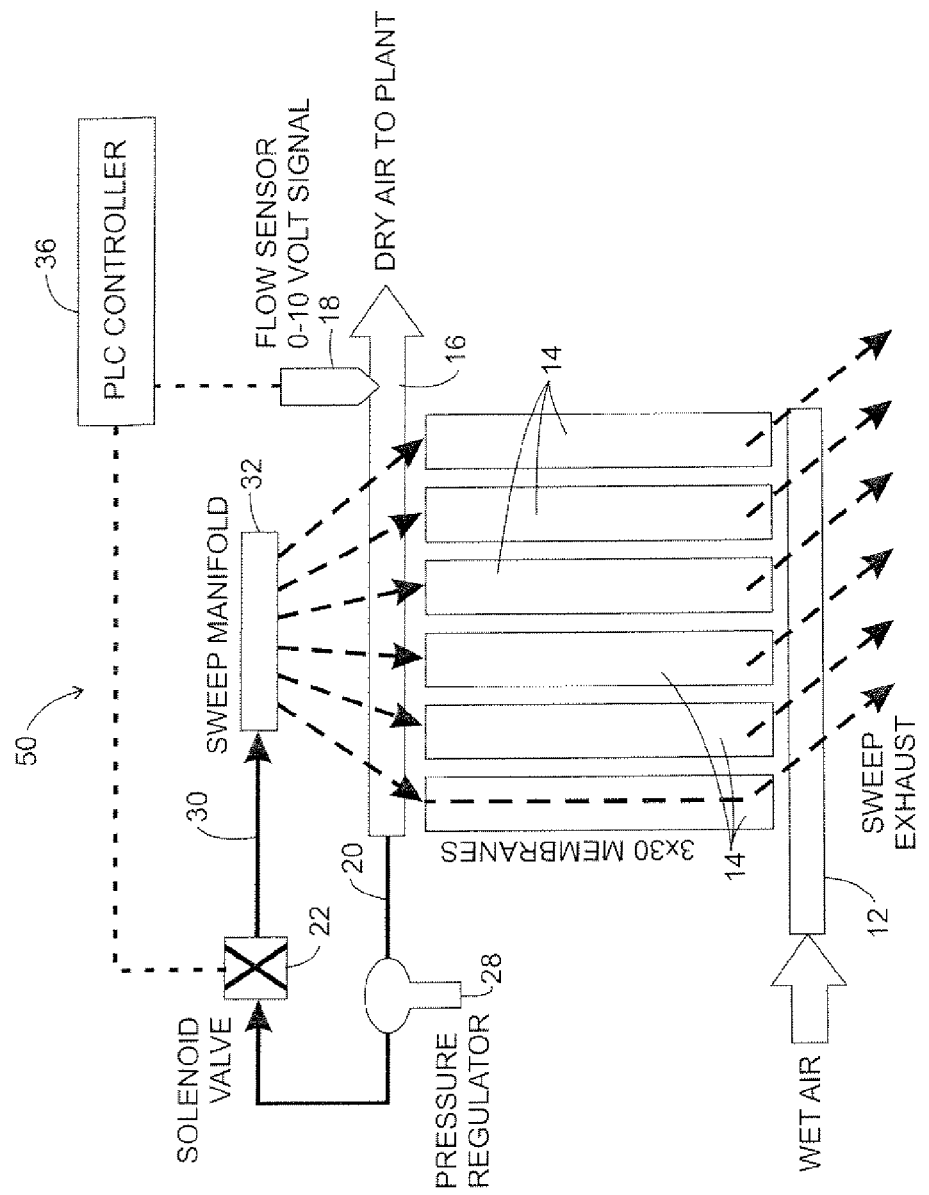
FIG. 3 is a schematic showing of a second embodiment of this invention.

Moving now to FIG. 3, there is shown a schematic diagram of a second embodiment of the present invention. Specifically, there is shown an air dryer system 50 which is very similar to system 10 shown in FIG. 1, with the same numerals being utilized for the same parts. System 50, in contrast to system 10, utilizes but a single solenoid valve 22 and uses no orifices 24 or 26.

In operation, the control of the duty cycle (on/off operation) of solenoid valve 22 is controlled by a micro PLC or a PLC controller 36 and an analog flow or differential pressure sensor 18, similar to that of system 10. For example, the analog signal, emanating form sensor 18 is divided into several ranges and assigned to different duty cycles programmed into the PLC, e.g., if the analog signal is divided into five ranges (0%, 20%, 40%, etc. of full range), these ranges can be assigned to a corresponding duty cycle (0%, 20%, 40%, etc.). Therefore, as the flow or differential pressure increase, indicating an increase in dry air consumption or usage, the sweep flow will increase, in discrete amounts, accordingly. Advantages of the function and control of system 50 include it being a very simple, reliable and cost effective control system. If so desired, greater sweep flow resolution can be obtained simply by programming additional duty cycles into the PLC. While such resolution is limited to the memory capacity of the PLC and the resolution (or accuracy) of the analog sensor, it is quite feasible to obtain a greater number of discrete sweep levels with only one solenoid valve.

Figure 4:
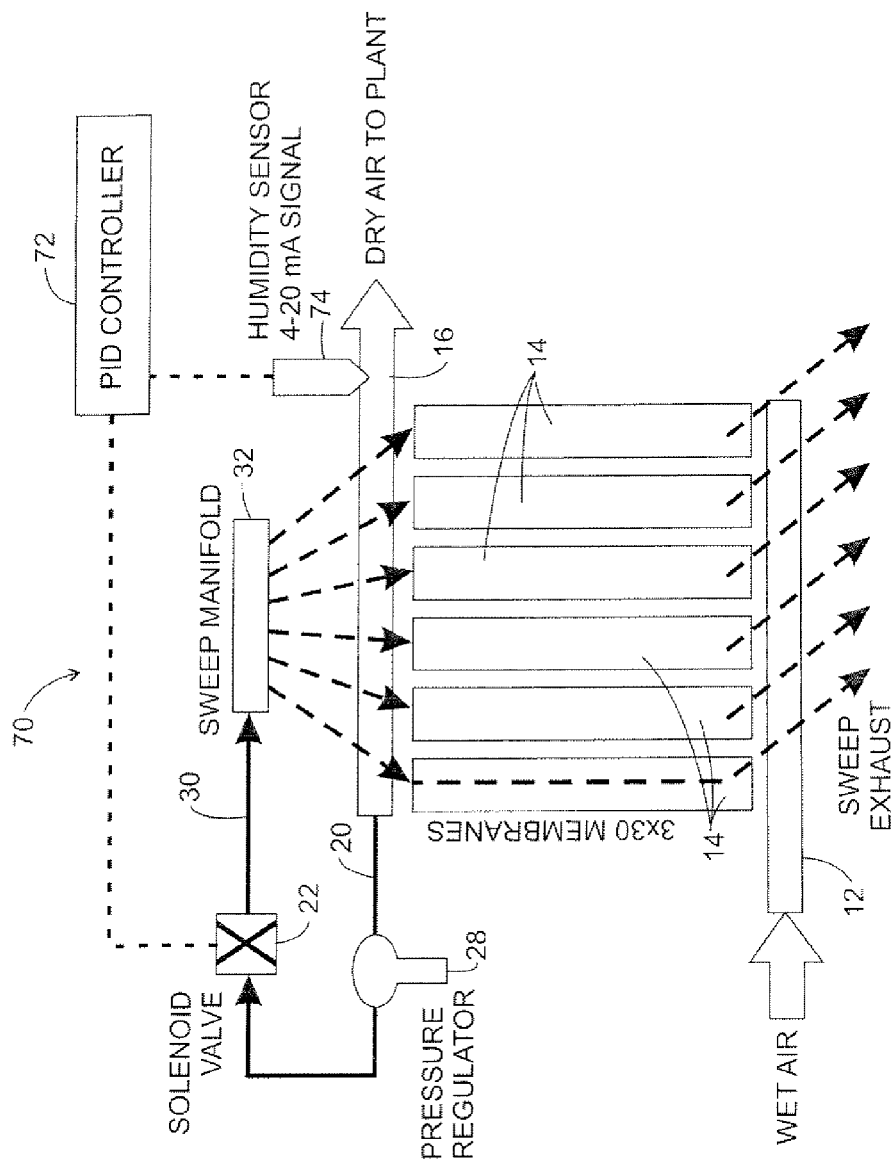
FIG. 4 is a schematic showing of a third embodiment of this invention.

Advancing now to FIG. 4, there is shown a schematic diagram of a third embodiment of the present invention. Specifically, there is shown an air dryer system 70, which again is very similar to that of FIG. 1 and a variation of that of FIG. 3, with the same numerals being used for like parts. System 70, in contrast to system 50 (FIG. 3), utilizes a PID controller 72, instead of the micro PLC or the PLC controller 36 of system 50. In addition, system 70 uses any desired commercial humidity sensor 74 (e.g., available from Parker-Hannifin Corporation) instead of the flow or differential pressure sensor 18 of system 50. For example, the use of a specific humidity sensor 74, in one instance, permits the measuring of the percent (%) saturation of the dried air and outputs an analog signal from about 0.8 to 3.8 volts proportional to the range of saturation, from 0% to 100%.

In operation, since the saturation signal is not proportional to the sweep flow, unlike differential pressure or flow, the use of a PID controller 72 is required to control the duty cycle of solenoid valve 22. Again, for example, a select set point, e.g., 50% saturation (or 2.15 volts in this instance), together with PID controller 72, will increase or decrease the duty cycle, which in turn will increase or decrease the sweep flow, as needed to maintain the selected set point. One of the advantages of the function and control of system 70 is that this system also permits greater flow control resolution in that, theoretically at least, the duty cycle could be adjusted almost infinitely, thus allowing for a full range of sweep flows, from zero to full sweep flow. In addition, changes in inlet moisture content, temperature, and system pressure will not adversely affect accuracy since the PID loop will adjust for these changes.

Figure 5:
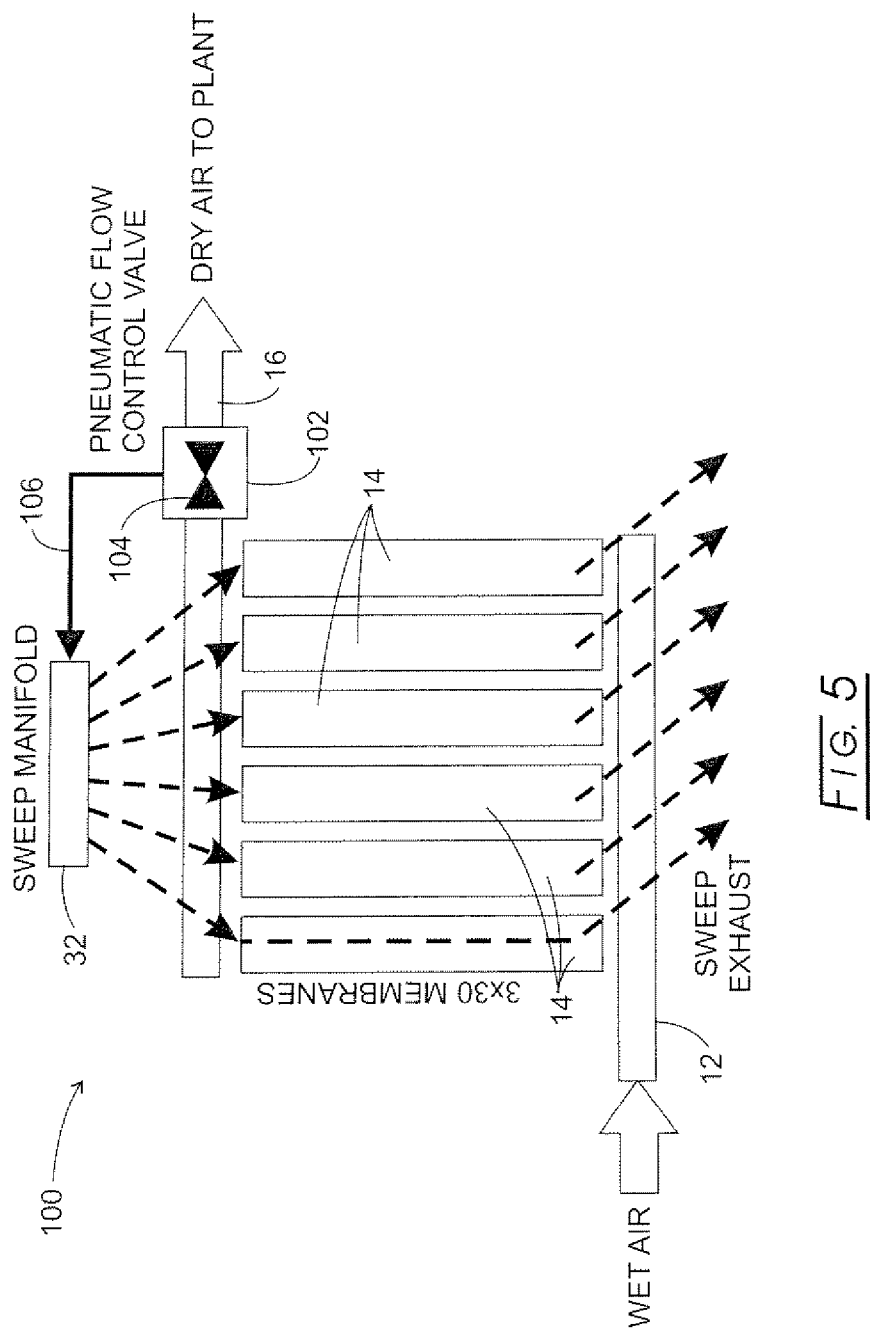
FIG. 5 is a schematic showing of a fourth embodiment of this invention.

Arriving now at FIG. 5, there is shown a schematic diagram of a fourth embodiment of the present invention. Specifically, there is shown an air dryer system 100 whose like parts, relative to system 10 (FIG. 1) are similarly denominated. System 100 differs from previously described systems 10, 50 and 70 in that it is simplified in regard thereto since it utilizes none of pressure regulator 28, solenoid valves 22, orifices 24, 26, flow or differential pressure sensors 18, humidity sensor 74, PLC or micro PLC 36 or PID controller 72. Instead, for example, dry air main output conduit 16, is provided with a pneumatic proportional flow control valve (PFCV) 102 that is adapted to measure the differential pressure across a fixed orifice 104 either built into valve 102 or within conduit 16. If desired, instead of a fixed restriction, a pressure drop across two locations, within system 100 could be utilized. Proportional flow control valve 102 is interconnected with sweep manifold 32 via a dry air diverter line 106 emanating from conduit 16 and delivers sweep flow air to sweep manifold 32. Commercial proportional flow control valves of the type used in this invention are available e.g., from McDantim Inc. of Helena Mont.

In the operation of system 100, as set forth in FIG. 5, proportional flow control valve 102 utilizes integral orifice 104 in dry air main output conduit 16 to induce a pressure drop. The sweep gas in dry air diverter line 106 is taken from conduit 16 on the high pressure side of orifice 104 and passed through a needle valve (not shown) and finally into a chamber (not shown), with control valve 102 being positioned on one end thereof and a diaphragm (not shown), connected to control valve 102, being positioned on the other end thereof. Control valve 102 is opened and closed by the noted diaphragm, which has the sweep gas on one side and low pressure (post-orifice 104) gas on the other side. With no gas (dry air) flowing, all pressures are equal and control valve 102 is closed. As gas flow increases, a pressure difference is produced across orifice 104 and subsequently across the diaphragm, thus opening control valve 102 and allowing flow of the sweep gas to sweep manifold 32 and dryer membranes 14. As gas or dry air flow changes in main conduit output 16, control valve 102 opens and closes accordingly, thus causing the pressure drop across the needle valve, to mirror the pressure drop across orifice 104 and thus maintaining the flow of sweep gas, in diverter line 106, proportional to the main gas flow in conduit 16. The noted needle valve can be adjusted to set the desired percentage of sweep gas to main flow.

Functional and operational advantages of system 100 include that no electricity is required for system operation and it is easy to integrate into existing air dryer systems inasmuch as one needs to simply mount the valve on the dry air outlet conduit or manifold and plumb the sweep manifold. In addition, the proportional flow control valve is able to control the sweep flow across the entire range of possible sweep flows, from zero to maximum sweep flow.

While there are shown and described several preferred embodiments of this invention, it is to be distinctly understood that the invention is not limited thereto, but may be otherwise variously embodied and practiced within the scope of the following claims.

What is claimed is:

1. A process for controlling the volume of the flow of dry air, dried to a predetermined degree of dryness, emanating from a sweep manifold of an air dryer system, flowing over a plurality of gaseous/liquid fluid separating membranes of said air dryer system, said process comprising:
    a. diverting a predetermined volume of dried air, at a predetermined pressure, to a sweep manifold;
    b. sensing one of the flow volume and the humidity values of the remainder of said dried air and converting said one of said flow volume and humidity values to electrical signals, and;
    c. using a controller, for achieving the predetermined degree of dryness of said air, and utilizing said electrical signals for controlling at least one solenoid valve which in turn controls the flow volume of said predetermined volume of dried air diverted to said sweep manifold; wherein said sensing is the sensing of said flow volume and said controller controls at least two solenoid valves associated with different sized orifices, respectively.

2. The process of claim 1, wherein said controller, by sequencing said at least two solenoid valves, controls said flow volume values over said membranes.

3. The process of claim 2, wherein said sequencing includes pluralities of operational and non-operational combinations of said solenoid valves.

4. A process for controlling the volume of the flow of dry air, dried to a predetermined degree of dryness, emanating from a sweep manifold of an air dryer system, flowing over a plurality of gaseous/liquid separating membranes of said air dryer system, said process comprising:
    a. diverting a predetermined volume of dried air, at a predetermined pressure, to a sweep manifold;
    b. sensing one of the flow volume and the humidity values of the remainder of said dried air and converting said one of said flow volume and humidity values to electrical signals, and;
    c. using a controller, for achieving the predetermined degree of dryness of said air, and utilizing said electrical signals for controlling at least one solenoid valve which in turn controls the flow volume of said predetermined volume of dried air diverted from said sweep manifold; wherein said sensing is the sensing of said humidity values and said controller controls the duty cycle of said at least one solenoid valve, thereby controlling said flow volume values over said membranes.

5. The process of claim 4, wherein said duty cycle comprises repeating cycles of on/off operation.

6. A process for controlling the volume of the flow of dry air, dried to a predetermined degree of dryness, emanating from a sweep manifold of an air dryer system, flowing over a plurality of gas/liquid fluid separating membranes of said air dryer, said process comprising:
    a. diverting a predetermined volume of dried air to a sweep manifold;
    b. sensing one of the flow volume and humidity values of the remainder of said dried air or the pressure differential within said air dryer system; and
    c. utilizing one of said flow volume, said humidity value and said differential pressure to control the flow volume of said predetermined volume of dried air and utilizing a controller for achieving the predetermined degree of dryness of said air by controlling at least one solenoid valve which, in turn, controls the flow volume of said predetermined volume of dried air diverted to said sweep manifold; wherein said sensing is the sensing of said flow volume, and said controller controls at least two solenoid valves, associated with differing size orifices, respectively.

7. The process of claim 6, wherein said controller, by predetermined sequencing said at least two solenoid valves, controls said flow volume.

8. The process of claim 7, wherein said predetermined sequencing includes pluralities of operational and non-operational combinations of said solenoid valves.

9. A process for controlling the volume of the flow of dry air, dried to a predetermined degree of dryness, emanating from a sweep manifold of an air dryer system, flowing over a plurality of gas/liquid separating membranes of said air dryer, said process comprising:
    a. diverting a predetermined volume of dried air to a sweep manifold;
    b. sensing one of the flow volume and humidity values of the remainder of said dried air or the pressure differential within said air dryer system; and
    c. utilizing one of said flow volume, said humidity value and said differential pressure to control the flow volume of said predetermined volume of dried air and utilizing a controller for achieving the predetermined degree of dryness of said air by controlling at least one solenoid valve, which. in turn, controls the flow volume of said predetermined volume of dried air diverted to said sweep manifold; wherein said sensing is the sensing of said humidity values and said controller controls the duty cycle of said at least one solenoid valve, thereby controlling said flow volume of said dry air over said membrane.

10. The process of claim 9, wherein said duty cycle includes pluralities of repeating cycles of on/off operation.

* * * * *